Figure 1:
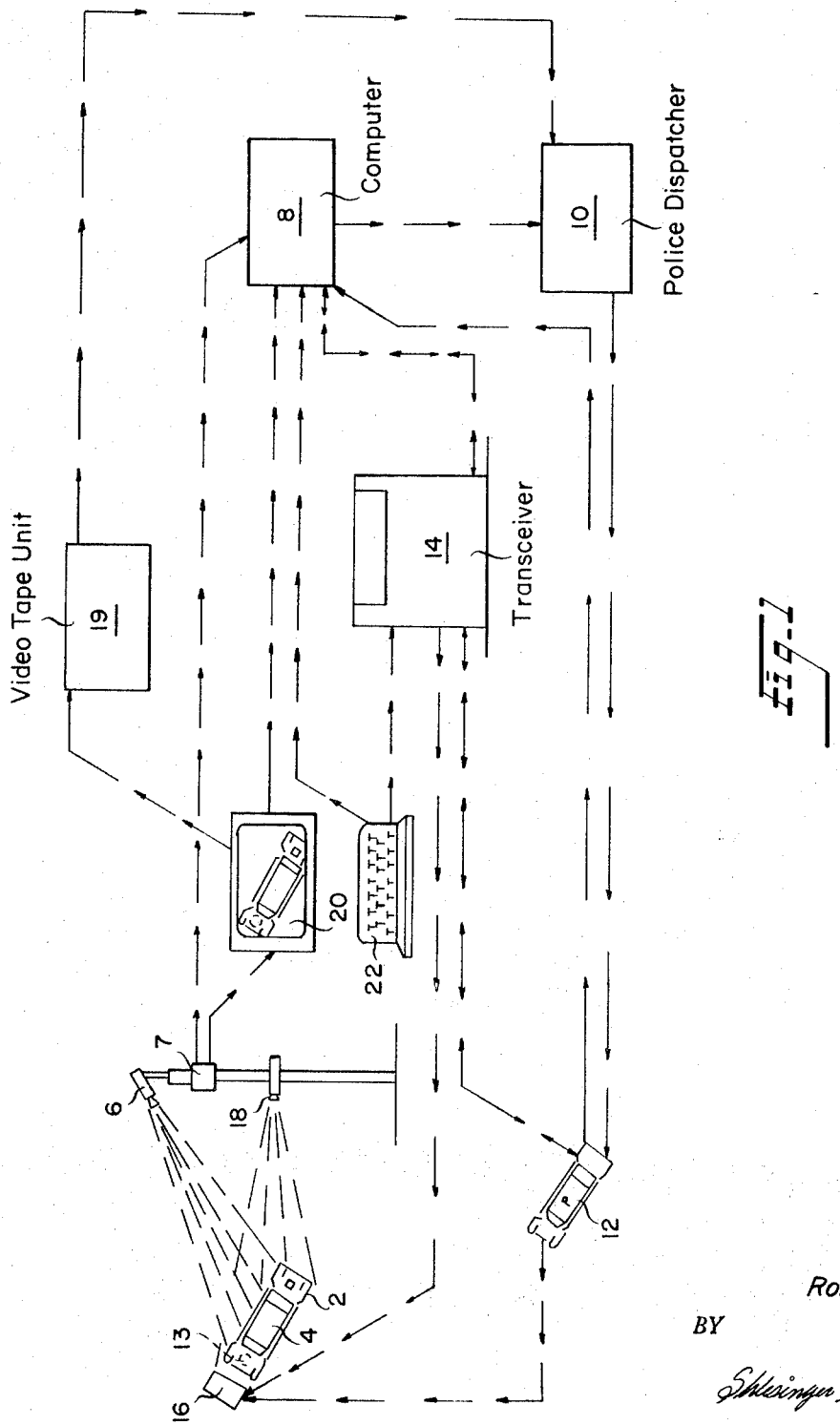

United States Patent [19]
Royster, Sr.

[15] 3,656,111
[45] Apr. 11, 1972

[54] COMPUTER CONTROLLED STOLEN VEHICLE DETECTION SYSTEM

[72] Inventor: Ronald B. Royster, Sr., 1705 Belle Haven Drive, Apt. 203, Landover, Md. 20785

[22] Filed: Sept. 27, 1968

[21] Appl. No.: 763,267

[52] U.S. Cl..............................340/149, 340/171, 343/225
[51] Int. Cl.........................................H04q 3/00, H04q 5/00
[58] Field of Search................340/149, 149 A, 171; 343/225

[56] References Cited

UNITED STATES PATENTS

| | | | |
|---|---|---|---|
| 2,188,293 | 1/1940 | Williams | 343/225 |
| 2,914,746 | 11/1959 | James | 340/149 A |
| 3,126,837 | 3/1964 | Noye | 340/149 A |
| 3,293,549 | 12/1966 | Patterson | 343/225 |
| 3,337,992 | 8/1967 | Tolson | 343/225 |
| 3,353,006 | 11/1967 | Pollock | 340/149 A |
| 3,408,458 | 10/1968 | Hennis | 340/149 A |

Primary Examiner—Harold I. Pitts
Attorney—Shlesinger, Arkwright & Garvey

[57] ABSTRACT

A method for detecting stolen or other wanted vehicles which comprises positioning the detecting means at a plurality of locations for detecting vehicles which have been specifically marked for selective individual identification, and providing transmitting means at each of the locations for transmission of detected vehicular information to a central computer. Each of the detecting means and transmitting means is operated simultaneously with the computer which stores stolen vehicle information, and compares the stored information with the detected vehicular information transmitted from the transmitting means to the computer. After the information is compared, a signal is transmitted corresponding to the stolen vehicle information to immobilize the stolen vehicle near the detecting means.

5 Claims, 2 Drawing Figures

COMPUTER CONTROLLED STOLEN VEHICLE DETECTION SYSTEM

HISTORICAL BACKGROUND

Over the past ten years, the rate of crime in urban areas has increased tremendously, and included in this crime is auto theft. Not only are vehicles stolen for "pleasure rides," but additionally, large car theft rings have developed for the purpose of stealing automobiles and stripping all valuable equipment therefrom. Statistics indicate that in Washington, D. C. alone, over 13,000 vehicles were stolen in 1967. This is an average of over 35 cars per day. Some car thieves who have been apprehended, have boasted of stripping all valuable equipment from a car in less than 30 minutes. Although police maintain records of reported stolen vehicles, these lists sometimes number over 100 pages. Thus, the problem is of such magnitude that the police force cannot possibly retrieve many of the stolen cars.

Thus, it is seen that a tremendous need exists for a means for assisting the police department in the identification, location, and apprehension of stolen vehicles.

OBJECTS AND SUMMARY

It is, therefore, a primary object of this invention to provide a method for rapidly detecting and arresting stolen vehicles.

Another object of this invention is to provide a method for detecting vehicles which have been marked for identification, and comparing the description of these detected vehicles with descriptions of stolen cars.

Another object of this invention is to provide means for arresting a vehicle which has been determined stolen.

Another object of this invention is to provide means for photographing a vehicle which has been determined stolen in order to determine if the vehicle has been physically altered.

Another object of this invention is to provide a means whereby a police unit will be advised of the location of a stolen vehicle.

Still another object of this invention is to provide a means for marking all vehicles so that they may be identified if stolen.

These and other objects and advantages of this invention will be apparent from the following description and claims.

Figure 2:
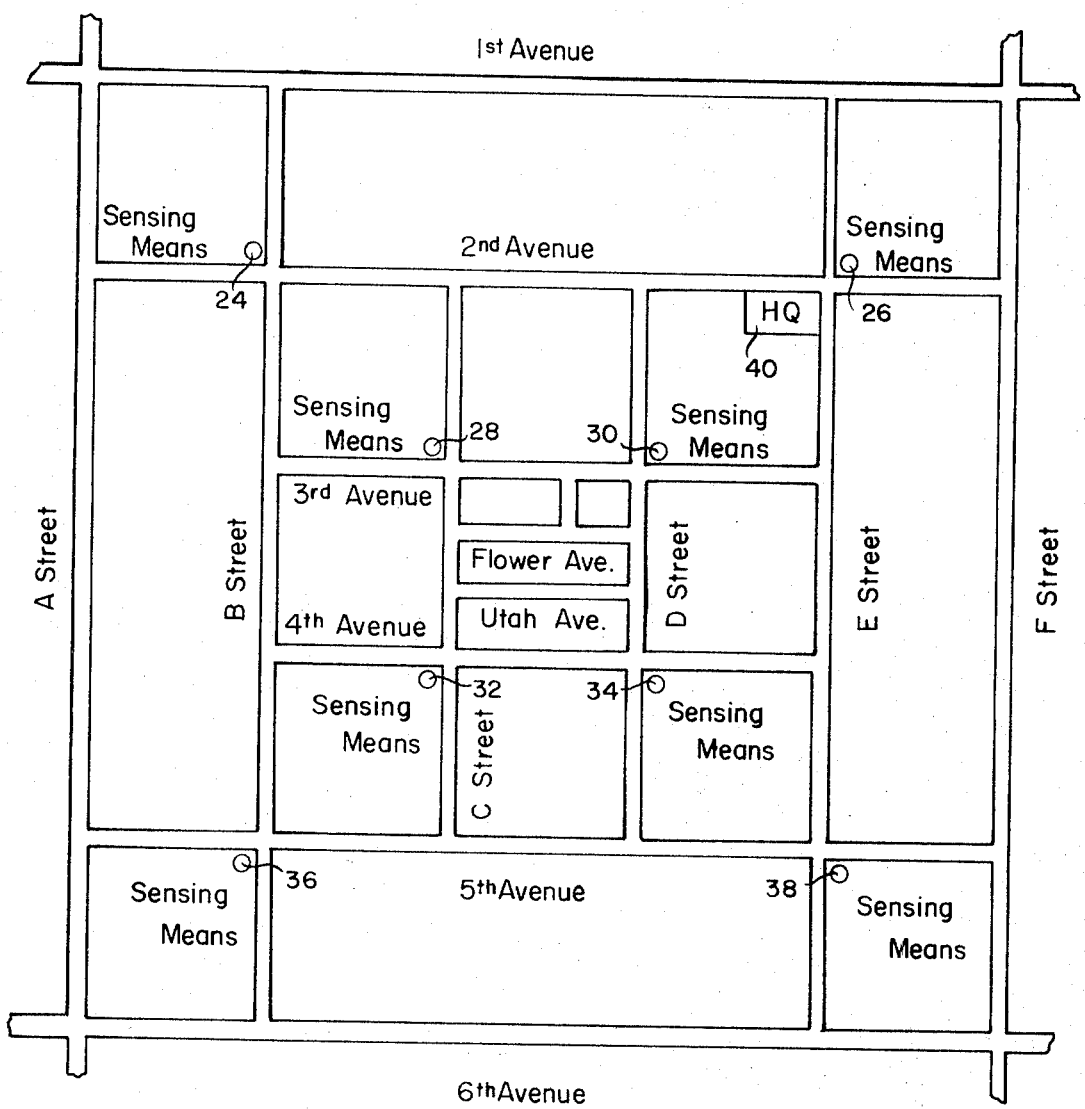

In the accompanying drawings which illustrate the various embodiments of this invention:

FIG. 1 is a diagrammatic view illustrating the various components of this invention; and FIG. 2 is a diagrammatic view of a zonal arrangement of the detecting means.

In FIG. 1, vehicle 2 is shown having identification means 4 thereon. This identification means may consist of a plate 4 having a coding thereon which may be detected by detector 6 which may be a radarscope, video camera, electronic device, etc. The identification means may comprise a plate having indicia thereon for identifying the vehicle, or the identification means may consist of a coded material embedded in the paint of a vehicle, or the windshield of the vehicle, or any suitable indicia which may be painted on the vehicle with phosphorescent, fluorescent or radioactive materials. The identification means must be readily detected by detector 6. When a vehicle passes within the range of detector 6, the detector reads the coded identification and transmits the identification information, by means of transmitter 7 to computer 8. The computer memory contains a listing of all vehicles reported stolen and the information received from the detector is compared with the information on known stolen vehicles. If the vehicle 2 is determined by the computer not to be a known stolen vehicle, no further action is taken. If, however, the detected vehicle 2 is determined by computer 8 to be stolen, according to one embodiment of this invention, an information signal is transmitted to the police dispatcher 10 who in turn informs a mobile police unit 12 located near detector 6, that a stolen vehicle has just passed the detector 6. The description of the vehicle 2 may also be transmitted to the mobile police unit 12. The mobile police unit 12 may then arrest the stolen vehicle 2. It is contemplated that the detector would pick up any vehicle which has been altered by destroying, covering, or concealing the detectable information thereon.

Since it may not be practical to station a mobile police unit near detector 6, additional means are provided according to the second embodiment of this invention for arresting a stolen vehicle. According to this embodiment, all vehicles which are identified as indicated above would additionally be provided with a remotely actuated switching means 13 for turning off the vehicle ignition current in response to a specific signal. In this regard, transceiver 14 would receive a signal from the computer, and would simultaneously transmit a signal to a receiver device in the vehicle and render a stolen vehicle 2 inoperative, e.g., by turning off the vehicle ignition current or by shutting off fuel, etc.

In a further embodiment of this invention, transceiver 14 would transmit a signal in response to a signal from computer 8, for erecting barricade 16, blocking the path of vehicle 2. Barricade 16 would continue to block the path of vehicle 2 until the police car 12 arrived.

Still a further embodiment of this invention would include providing a camera 18 at the same location as detector 6. Upon receipt of a signal from transceiver 14, camera 18 would photograph the stolen vehicle 2. The photograph thus taken could be used to determine if the physical appearance of the vehicle had been altered, such as by repainting, or it could be used later as evidence. Storage is done in video tape unit 19.

Camera 18 could also be a video tape camera for immediately displaying a stolen vehicle at police headquarters. An operator at police headquarters would view the stolen vehicle on screen 20, and would use teletypewriter 22 to transmit any change in the vehicle appearance to computer 8.

In FIG. 2, members 24, 26, 28, 30, 32, 34, 36, and 38 are detectors positioned at intersections of main arteries so as to establish a grid pattern. In case a vehicle was determined by detector 24 to be stolen, and if a police unit could not arrive rapidly enough to arrest the stolen vehicle, the path of the stolen vehicle through the various zones of the grid could be traced. In this manner, when a stolen vehicle was known to be approaching a given area, a police car could be dispatched to arrive at that area at approximately the same time as the stolen vehicle, for arresting the stolen vehicle.

In FIG. 2, police headquarters is indicated at 40, however, it will be apparent that the grid could be established so that headquarters is at any location on the grid.

The police mobile unit 12 can include a teletypewriter if necessary for operation by an officer.

While this invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention, what I claim is:

1. A system for detecting and immobilizing stolen vehicles on a roadway at a predetermined location comprising:
    a. coded information means positioned on said vehicles for specifically and individually identifying said vehicles,
    b. stationary electrically operated automatic scanning means positioned at said location on said roadway for scanning said roadway and detecting said coded information means,
    c. a central information receiving center,
    d. means connected to said scanning means for transmitting detected coded information to said central information receiving center,
    e. said central information receiving center having computer means for storing stolen vehicle information, receiving detected coded information, and comparing said detected coded information with said stolen vehicle information for determining if a vehicle is stolen, f. electrically operated automatic means for immobilizing a vehicle if determined stolen, and g. means associated with said computer means for automatically transmitting a signal to said immobilizing means for actuating said immobilizing means.

2. A system for detecting and immobilizing stolen vehicles on a roadway at a predetermined location as in claim 1 and wherein:

a. said coded information means includes coded indicia on said vehicles.

3. A system for detecting and immobilizing stolen vehicles on a roadway at a pre-determined location as in claim 1 and wherein:

a. said immobilizing means includes means mounted on said vehicles for rendering said vehicles inoperative.

4. A system for detecting and immobilizing stolen vehicles on a roadway at a predetermined location as in claim 1 and wherein:

a. said immobilizing means includes retractable barrier means for blocking the path of said stolen vehicle.

5. A system for detecting and immobilizing stolen vehicles on a roadway at a predetermined location as in claim 1 and including:

a. means for photographing stolen vehicles.

* * * * *